United States Patent [19]

Green

[11] Patent Number: 4,730,495

[45] Date of Patent: Mar. 15, 1988

[54] ULTRASONIC REFLEX TRANSMISSION IMAGING METHOD AND APPARATUS

[75] Inventor: Philip S. Green, Atherton, Calif.

[73] Assignee: SRI International, Menlo Park, Calif.

[21] Appl. No.: 875,317

[22] Filed: Jun. 17, 1986

Related U.S. Application Data

[63] Continuation-in-part of Ser. No. 715,199, Mar. 22, 1985, Pat. No. 4,608,868, and a continuation-in-part of Ser. No. 755,287, Jul. 15, 1985, Pat. No. 4,624,143.

[51] Int. Cl.⁴ .................................................. G01N 29/00
[52] U.S. Cl. ............................................... 73/620; 73/606
[58] Field of Search ................ 73/602, 606, 607, 609, 73/618, 620, 627, 628, 631, 625, 626; 128/660

[56] References Cited

U.S. PATENT DOCUMENTS

| | | | |
|---|---|---|---|
| 3,918,025 | 11/1975 | Koshikawa et al. | 73/626 |
| 3,937,066 | 2/1976 | Green et al. | 73/607 |
| 4,016,750 | 4/1977 | Green | 73/629 |
| 4,163,394 | 8/1979 | Soldner | 73/626 |
| 4,241,610 | 12/1980 | Anderson | 73/626 |
| 4,305,296 | 12/1981 | Green et al. | 73/626 |
| 4,307,613 | 12/1981 | Fox | 73/626 |
| 4,409,839 | 10/1983 | Taenzer | 73/625 |
| 4,413,520 | 11/1983 | Murakami et al. | 73/609 |
| 4,437,348 | 3/1984 | Sasaki | 73/625 |
| 4,446,740 | 5/1984 | Wilson et al. | 128/660 |
| 4,457,175 | 7/1984 | Ramsey, Jr. et al. | 73/606 |
| 4,470,305 | 9/1984 | O'Donnell | 73/626 |
| 4,478,085 | 10/1984 | Sasaki | 73/625 |
| 4,520,830 | 1/1985 | Flanagan, III | 73/631 |
| 4,542,653 | 9/1985 | Liu | 73/626 |
| 4,596,145 | 6/1986 | Smith et al. | 73/626 |
| 4,662,380 | 5/1987 | Riley | 128/660 |

OTHER PUBLICATIONS

H. Kanda et al., "Acoustic Microscope Observation of a Biological Specimen in a Total Reflector Backing Configuration" Ultrasonic Imaging 5, 161–194 (1983).
P. D. Edmonds et al., "A Human Abdominal Tissue Phantom" Ultrasonic Tissue CHaracterization II, M. Linzer, ed., Nat. Bureau of Standards, Spec. Publ. 525 (1977).
J. C. Machado, et al., "Acoustic Wave Propagation in Randomly Distributed Spherical Particles", J. Acoust. Soc. Amer., 74(5), 1983.

Primary Examiner—Michael J. Tokar
Assistant Examiner—Louis M. Arana
Attorney, Agent, or Firm—Victor R. Beckman

[57] ABSTRACT

A reflex transmission ultrasonic imaging system and method are shown comprising an ultrasonic transducer array of either a two dimensional or linear type acoustically coupled to a subject. An ultrasonic energy beam is transmitted by the array into the subject to insonify an image plane, in the case of the two dimensional array, or a line in the image plane in the case of the linear transducer array. Electronic focusing is employed during the reception of echo signals for simultaneously focusing the transducer array at a plurality of focal points while echo signals are received from a range zone opposite the focal points. For the two dimensional array case, an array of focal points is provided in the focal plane, and in the linear array case a line of focal points in the focal plane is provided during reception. Echo signals are processed by detecting and then integrating the same over a period of time that they are received from the range zone opposite the associated focal points to produce a plurality of pixel values that are substantially dependent upon and provide a measure of attenuation of ultrasonic waves at the focal points. Alternatively, a contoured surface may be imaged. Processing of signals over only a portion of the range zone is provided when the zone is not substantially uniform in its reflective properties. A reflector which includes a stack of corner reflector arrays may be coupled to the object for reflection of ultrasonic waves back into the object in the vicinity of the focal points.

39 Claims, 9 Drawing Figures

ULTRASONIC REFLEX TRANSMISSION IMAGING METHOD AND APPARATUS

RELATED APPLICATIONS

This is a continuation-in-part application of U.S. patent application Ser. No. 715,199 filed Mar. 22, 1985, now U.S. Pat. No. 4,608,868, by Philip S. Green entitled Ultrasonic Reflex Transmission Imaging Method and Apparatus, and of U.S. patent application Ser. No. 755,287 filed July 15, 1985, now U.S. Pat. No. 4,624,143, by Philip S. Green entitled Ultrasonic Reflex Transmission Imaging Method and Apparatus with External Reflector.

FIELD OF THE INVENTION

This invention relates generally to an ultrasonic imaging method and apparatus and to a reflector for use therewith.

BACKGROUND OF THE INVENTION

Ultrasonic imaging systems of the transmission type wherein a transmitting transducer and a receiving transducer are located at opposite sides of an object or specimen under examination are well known as shown, for example, in U.S. Pat. Nos. 3,937,066, Green et al and 4,457,175, Ramsey, Jr. et al. Generally C-scan images are provided by transmission type systems which lie in a plane normal to the transmitted waves. Echo type ultrasonic imaging systems also are well known as shown, for example, in U.S. Pat. Nos. 4,016,750, P.S. Green and 4,305,2116, Green et al. Generally B-scan type images are produced by echo type systems wherein the image formed lies in a plane containing the propagated waves. Of course, C-scan images also may be obtained using echo techniques. Ultrasonic systems which include the use of an acoustic reflector behind a specimen to be examined are known as shown in H. Kanda et al., "Acoustic Microscope Observation of a Biological Specimen in a Total Reflector Backing Configuration" Ultrasonic Imaging 5, 161–1114 (June 1983).

SUMMARY AND OBJECTS OF THE INVENTION

An object of this invention is the provision of an ultrasonic imaging system and method which combine features of echo and transmission type systems for improved imaging.

An object of this invention is the provision of an improved echo-transmission type ultrasonic imaging system and method wherein a plurality of pixel values are recurrently substantially simultaneously obtained by use of echo signals obtained from a range zone opposite the plane to be imaged which allows for rapid acquisition of complete images at the plane.

An object of this invention is the provision of an echo-transmission type ultrasonic imaging system of the above-mentioned type for imaging a contoured rather than plane surface.

An object of this invention is the provision of an improved reflector for use with an ultrasonic reflex transmission imaging system which reflector is acoustically coupled to the surface of an object to be imaged opposite an ultrasonic probe.

In accordance with the present invention a transmitter energizes an ultrasonic transducer array of either the linear or two-dimensional type for beaming ultrasonic energy into an object to be examined. The transmitted beam is substantially unfocused in the two-dimensional transducer array case, and may be focused in one dimension along a line substantially parallel to the linear array in the linear transducer array case. Reflected ultrasonic energy waves received by the transducer array are converted to electrical signals. The receiver portion of the system includes signal processing means responsive to the electrical signals from the transducer elements for electronically focusing at a plurality of focal points in the image plane. Signals received from a range zone located beyond the plane at which the receiving transducer elements are focused are processed to provide pixel values related to signal attenuation at the image plane. In the linear transducer array case, focusing during receiving operation at points substantially along a line is accompanied by beam scanning to obtain pixel values for a plurality of lines in the image plane.

A contoured surface, rather than plane surface, may be imaged by detecting the surface position as by conventional processing of echo signals, then using the resultant range information to electronically focus at a plurality of focal points on the contoured surface during the receiving process, and to range gate the signal processing means for processing echo signals received from range zones beyond the associated focal points to provide pixel values related to signal attenuation at the contoured surface.

Range zones from which received signals are processed may be of different length, if desired, in which case the processed signals are weighted, or scaled, to correct for differences in pixel values which result from processing signals from range zones of different length. Adjustment of the length of the range zones may be used to avoid processing of signals from zones that are not substantially uniform in reflective properties.

A reflector comprising a plurality of layers of acoustic transmitting material may be coupled to the object under examination opposite the transducer means for reflecting acoustic signals back into the object. The layers are formed at at least one surface thereof with an array of corner reflectors for reflecting focused transmitted acoustic waves back through the vicinity of the focus.

The invention, together with other objects, features, and advantages thereof will be more fully understood from a consideration of the following detailed description of certain embodiments thereof taken in connection with the accompanying drawings. It here will be understood that the drawings are for purposes of illustration only, the invention not being limited to the specific embodiments disclosed therein.

BRIEF DESCRIPTION OF THE DRAWINGS

In the drawings, wherein like reference characters refer to the same parts in the several views.

Figure 1:
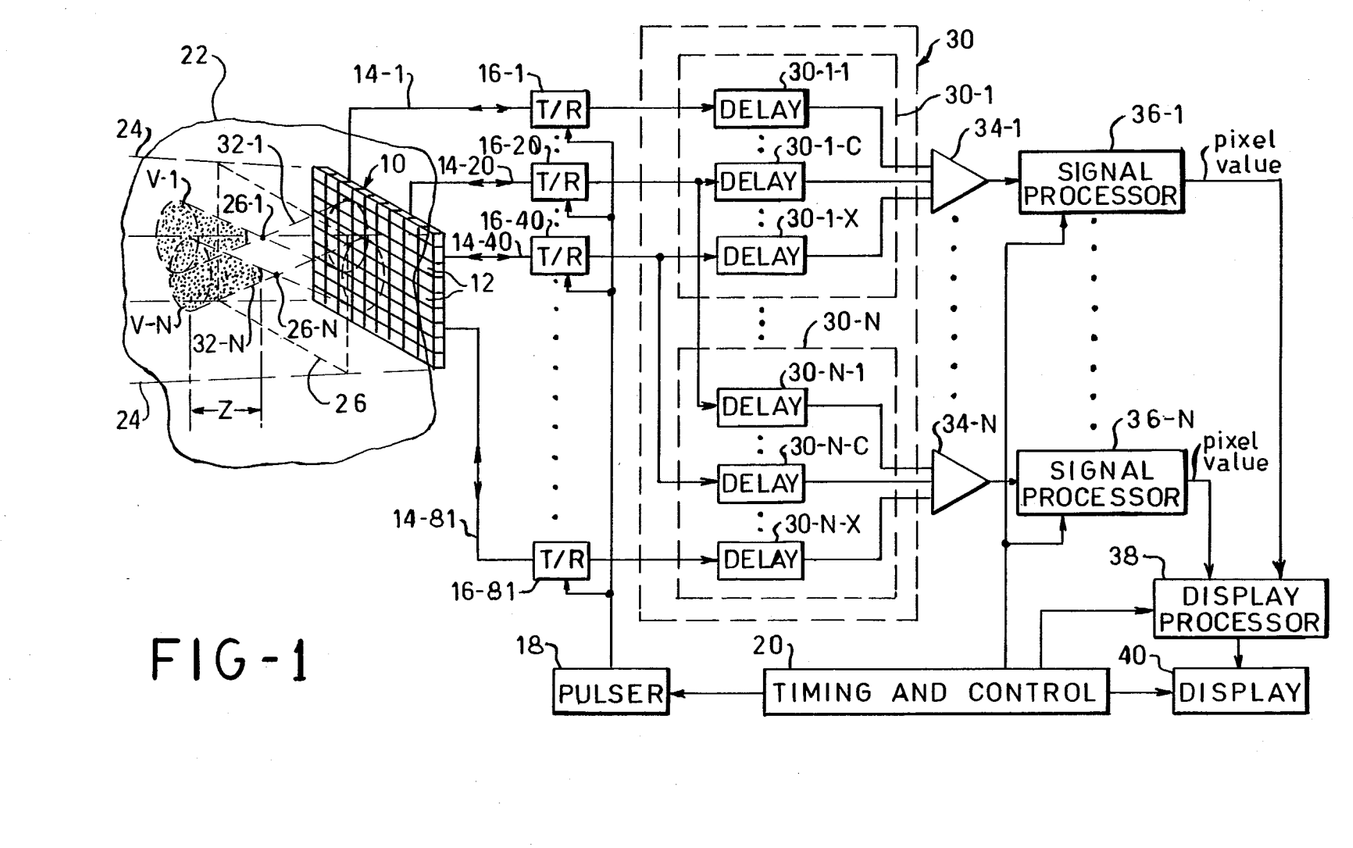
FIG. 1 is a block diagram showing an ultrasonic imaging system embodying the present invention.

Reference first is made to FIG. 1 wherein there is shown an ultrasonic imaging system of the C-scan type comprising a two-dimensional ultrasonic transducer array 10 which includes rows and columns of transducer elements 12. For purposes of illustration, a 9×9 array of transducer elements is shown for a total of 81 elements. Each of the elements is connected by a line 14-1 through 14-81 to a transmit-receive switch 16-1 through 16-81. The transmitting portion of the system includes a pulser 18 which is supplied with recurrent timing pulses from a timing and control unit 20 for on-off control thereof. With the pulser turned on, a high frequency energy pulse is generated which is connected through the transmit-receive switches to the transducer elements. In the illustrated arrangement all of the transducer elements are simultaneously energized during pulse transmission of pulser 18. Ultrasonic compressional wave generated by transducer array 10 are coupled through a suitable acoustic transmission medium such as water, not shown, to the subject 22 under investigation.

A substantially unfocused beam 24 is transmitted into the subject 22 for insonification thereof. Typically, an operating frequency of from, say, 1MHz to 10MHz may be employed. In the illustrated arrangement, a C-scan image of plane 26 which does not intersect the transducer array 10 is obtained. For purposes of illustration, image plane 26 is substantially normal to the transmitted beam axis. Although the system is well adapted for imaging living organisms, it will be apparent that the invention is not limited to such particular application or use.

Reflected ultrasonic signals received by transducer 10 from scatterers or discontinuities, within the subject 22, or from reflecting means acoustically coupled to the subject opposite the transducer array, are converted to electrical signals at the transducer elements 12, which signals are supplied through transmit-receive switches 16-1 to 16-81 to signal delay means 30. Preamplifiers, not shown, may be included in the connection of the transmit-receive switches to the delay means for preamplification of relatively low level signals from the transducer elements. Signal delay means 30 provides for simultaneous electronic focusing of the transducer array at a plurality of different focal points within section 26 of subject 22. Simultaneous focusing at a substantially infinite number of focal points is possible. Although simultaneous focusing at a two dimensional array of focal points in focal plane 26 is provided, for purposes of illustration, only two such focal points 26-1 and 26-N are shown in FIG. 1 together with the associated receiver transducer array beam patterns 32-1 and 32-N.

Signal delay means 30 includes a plurality of sections 30-1 through 30-N where N is the number of focal points in section 26 from which pixel values are obtained for use in imaging section 26. Generally, a sufficient number of signal delay sections will be employed such that information for at least one field for display is obtained for every transmit-receive cycle of operation. Outputs from sections 30-1 through 30-N of signal delay means 30 are connected to summing circuits, such as summing amplifiers, 34-1 through 34-N, respectively.

Each section 30-1 through 30-N of signal delay means 30 includes a plurality of signal delay elements. In FIG. 1, delay elements 30-1-1 through 30-1-X are shown included in section 30-1, and delay elements 30-N-1 through 30-N-X are shown in section 30-N. The maximum number, X, of delay elements included in a section equals the number of transducer elements 12 included in transducer array 10. For example, the output from every transducer element may be supplied to a delay element in every section of signal delay means 30, if desired, for focusing at every selected point in image plane 26. As the beam patterns 32-1 and 32-N illustrate, not all transducer elements are employed for focusing at any one spot in the FIG. 1 arrangement. Also, it will be apparent that the outputs from one or more transducer elements in a selected group thereof need not be delayed to provide for focusing action during receiving operation. Therefore, some received signals may be directly connected to the summing circuits 34-1 to 34-N without passing through a signal delay element in signal delay means 30. That is, the signal delay for some transducer outputs may be zero.

Figure 2:
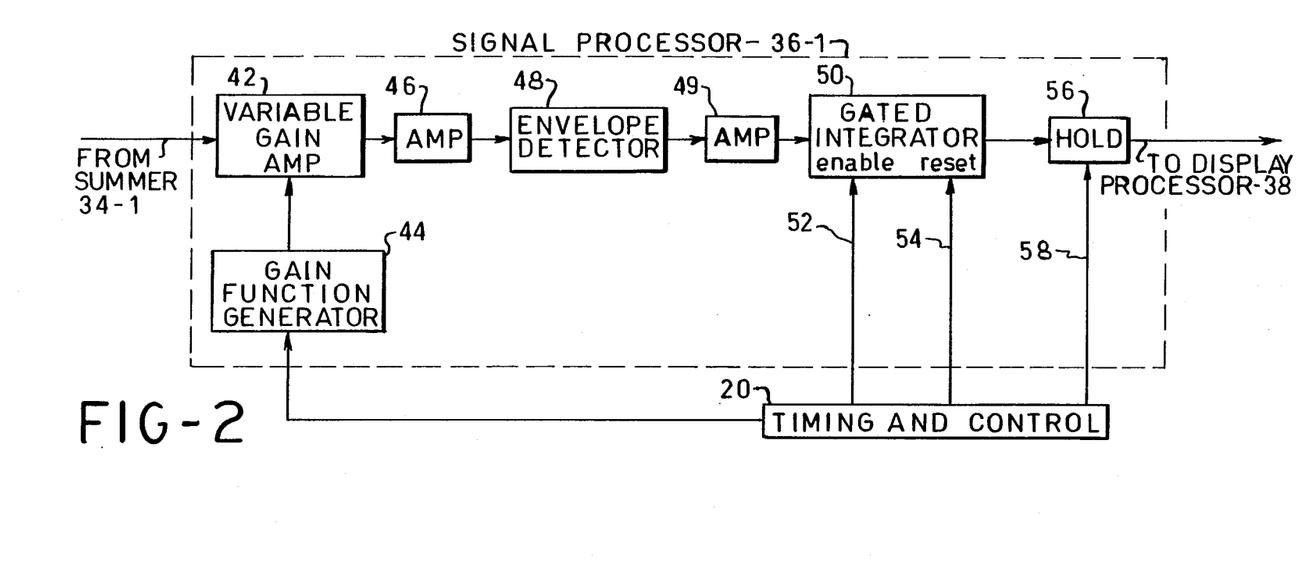
FIG. 2 is a block diagram showing details of one of the signal processors included in the system shown in FIG. 1.

The outputs from summing circuits 34-1 through 34-N are connected to the inputs of signal processing circuits 36-1 through 36-N, respectively. Details of a signal processing circuit are shown in FIG. 2 and described below. For present purposes it will be understood that signal processing circuits 36-1 through 36-N process those echo signals received from volumes V-1 through V-N within a range zone Z located behind the focal plane 26; that is, from a range zone located opposite the focal plane from the transducer. The range zone may be located adjacent the focal plane 26 and, if desired, the inner end of the range zone may be located at the focal plane. In the illustrated arrangement, only reflected signals received from within range zone Z are processed by signal processors 36-1 through 36-N. Obviously, echo signals received from different depths and/or range zones also may be processed, if desired.

The output from the signal processors 36-1 through 36-N comprise unitary signal values that are substantially dependent upon, and provide a measure of, attenuation of acoustic waves at focal points 26-1 through 26-N, respectively. These pixel values are supplied to a display processor 38, such as a scan converter, and thence to visual display means 40, such as a cathode ray tube, under control of timing and control unit 20 for visual display thereof. From the above it will be apparent that although the system is of the echo type, images are obtained from those signals which are reflected from a range zone Z opposite the focal plane to provide for transmission type imaging.

A signal processor 36 of the type which may be employed in the signal processor channels 36-1 to 36-N is shown in FIG. 2, to which figure reference now is made. The processor includes a variable gain amplifier 42 having an input from one of the summing circuits 34-1 through 34-N. The gain of amplifier 42 is time varied in accordance with the output from a gain function generator 44 under control of timing and control unit 20. Time variable gain may be used to compensate for greater attenuation of return signals received from further within the range zone Z. If desired, a time gain function may be employed which approximates the condition wherein reflected waves passing through a focal point 26-1 through 26-N from an associated volume V-1 through V-N within the range zone are of equal amplitude. From variable gain amplifier 42, received signals are shown coupled to amplifier 46 having a desired gain function. For example, amplifier 46 may comprise a linear amplifier or a non-linear amplifier.

The amplifier 46 output is detected as by an envelope detector 48 comprising, for example, a full wave rectifier with low pass filter means and having as an output a signal that is proportional to the envelope of the high frequency signal output from amplifier 46. The detector output is shown supplied through amplifier 49, of either a linear or non-linear type, to a gated integrated 50 for time integration thereof during the period that signals are received from within the associated range zone Z. In the illustrated arrangement, wherein the focal plane 26 is parallel to the transducer array 10, the integration period for gated integrators in each of the channels is the same. That is, the integrators are simultaneously operated. Integrator 50 is enabled, i.e. gated on, by an enable signal supplied thereto over line 52 from timing and control unit 20, and is reset by a reset signal supplied thereto from timing and control unit 20 over line 54.

The output from integrator 50 is transferred to a hold circuit 56 which is controlled by an output from timing and control unit 20 supplied thereto over line 58. The signal output from hold circuit 56 comprises a pixel value that is related to acoustic absorption at the associated focal point 26-1 through 26-N. This value is transferred to display processor 38 for display at visual display means 40 along with pixel values from each of the other signal processor channels. As noted above, a sufficient number of signal processor channels may be included in the system so that enough pixel values are obtained each receiving operation to provide for a complete field of display.

A brief description of the operation of the imaging system shown in FIGS. 1 and 2 now will be made with reference to the timing diagram of FIG. 3. At time T1 the transducer array 10 is energized by the output from pulser 18 for generation of a transmitter pulse 60 which is coupled to the object 22 for pulse insonification thereof. The transmitted beam is unfocused as indicated by beam 24 for insonification of the entire plane 26 to be imaged.

The output from amplifier 46 in the signal processor is identified by reference numeral 62, and the detector 48 output is identified by reference numeral 64. Integrator 50 in each signal processing channel is enabled between times T2 and T3 by enable signal 66, and the output from integrator 50 in one signal channel is identified by reference numeral 68. Integration of the detector 48 output, between times T2 and T3, is effected while echo signals are being received from range zone Z within an associated volume V-1 through V-N behind focal plane 26. At time T4 the output from gated integrator 50 in each signal channel is transferred to hold circuit 56 under control of hold control signal 70. The hold circuit outputs are supplied to the display processor 38 for processing in preparation for display at display unit 40. At time T5, the integrators 50 are reset by reset signal 72 in preparation for the next transmit-receive cycle.

From the above it will be apparent that range zone, Z, beyond the focal plane 26 is insonified upon transmission of an unfocused ultrasonic energy beam 24 into subject 22. Energy is scattered by inhomogeneities or discontinuities within range zone Z and, if the discontinuities, or scatterers, within range zone Z, are substantially uniformity distributed, then the volumes V-1 through V-N therein provide effective extended incoherent insonification sources. These volumes will provide most effective insonification if the waves reflected through associated focal points 26-1 through 26-N from each lamina of range zone are of substantially the same amplitude, and this condition may be approximated by time-gain correction of the receiver as noted above. However, if the signal to noise ratio at increased depths is too low, then a time-gain correction which provides for an improved signal to noise ratio at such depths may be employed. The amplitudes of received waves that pass through focal points at which groups of transducer elements are electronically focused are strongly influenced by attenuation within the focal points. Consequently, those waves passing through focal points 26-1 through 26-N have the most influence on the signal outputs from the respective summing amplifiers 34-1 through 34-N. By detecting and time integrating the summing amplifier outputs, pixel values related to attenuation at the focal points are obtained from the signal processor channels.

If desired, a plane of smaller size than plane 26 may be imaged, in which case a slightly focused transmitted ultrasonic beam may be employed, so long as the plane to be imaged is insonified by return signals from a range zone opposite the plane. For example, focusing during transmission may be provided by use of a plurality of transmitter pulsers for individual energization of transducer elements. With proper timing of the operation of the individual transmitter pulsers desired focusing of the transmitted beam is obtained. Alternatively, acoustical focusing means such as an acoustic lens, a curved acoustical mirror, or the like, may be used to lightly focus the transmitted acoustic energy beam. Also, it will be apparent that planes that are not normal to the acoustic axis of the transducer array may be imaged by use of different signal delay elements for focusing at different depths, and by integrating the detected signals over time periods that echo signals are received from beyond the associated focal points. If desired, signal delay means 30 may include variable delay elements for varying the location and/or angle of the plane 26 at which transducer elements are focused. In this case, gated integrators may be individually controlled for time integration of return signals from beyond the associated focal points.

Figure 4:
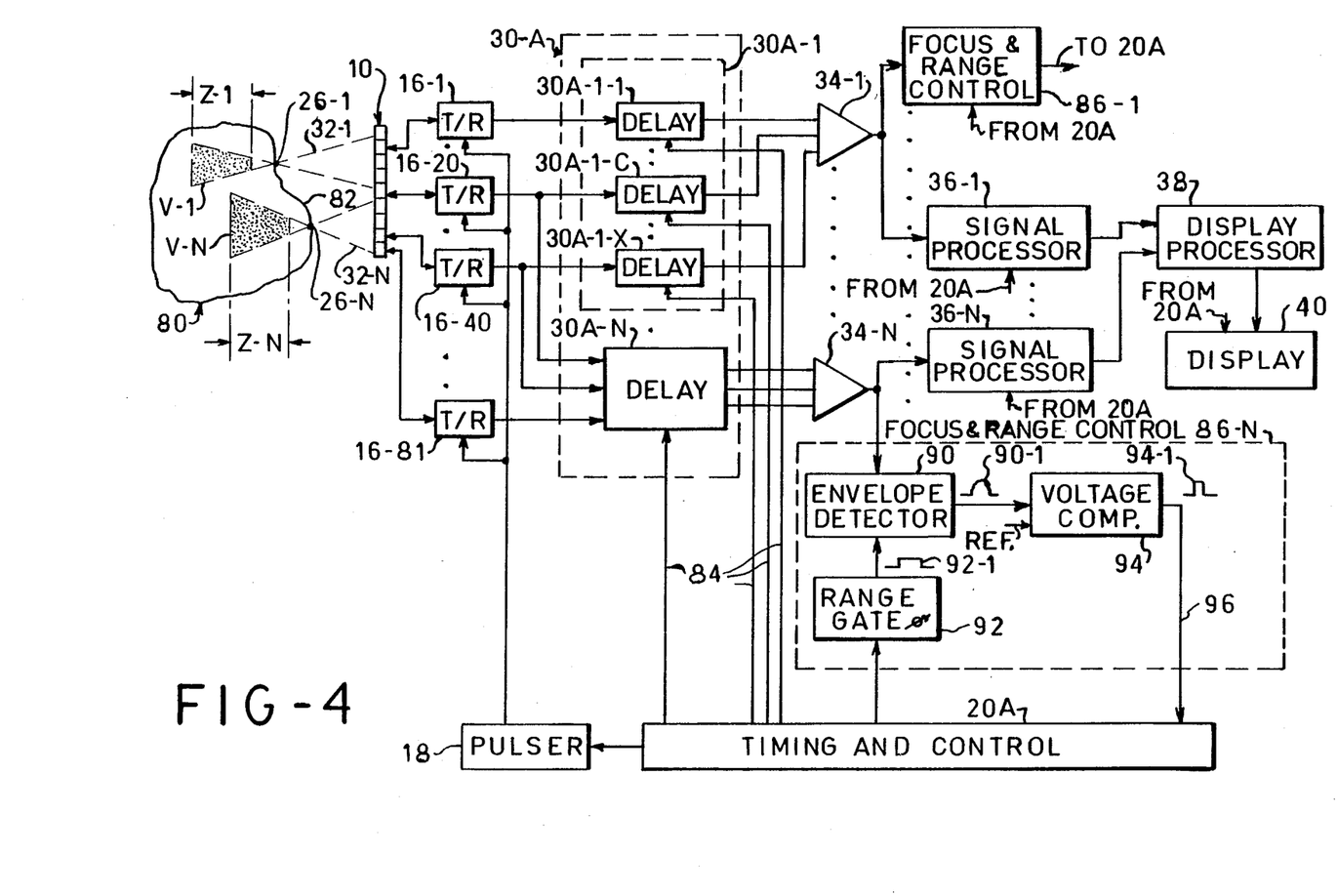
FIG. 4 is a block diagram showing a modified form of this invention which is similar to that shown in FIG. 1 and including means for focusing at a contoured surface.

Reference now is made to FIG. 4 wherein an ultrasonic imaging system which is similar to that of FIG. 1 is shown. With the system of FIG. 4 the individual focal points and associated range zones are adjustable in depth to provide for imaging of an irregular, or contoured, surface. In FIG. 4, transducer 10 is shown coupled, through means not shown, to object 80 having an irregular, or contoured, surface 82 to be imaged. Object 80 may comprise, for example a heart or other such organ having a surface from which a relatively large return signal may be obtained for use in accurately locating the surface. Two focal points 26-1 and 26-N of the numerous focal points at which the receiving transducer array is simultaneously focused are shown in FIG. 4 at the surface 82 of object 80.

As with the arrangement shown in FIG. 1, the transmitter portion of the ultrasonic imaging system includes a pulser 18 which is connected to transducer elements of transducer array 10 through transmit-receive switches 16-1 through 16-81 for insonification of the surface 82 to be imaged.

Signal delay means 30A in the receiver portion of the system include variable delay elements 30A-1-1 etc. instead of fixed delay elements as in the FIG. 1 arrangement. The amount of signal delay provided by the variable delay elements is controlled by control signals supplied thereto over lines 84 from timing and control unit 20A. As seen in FIG. 4, delay elements in sections 30A-1 and 30A-N of delay means 30A provide for beam patterns 32-1 and 32-N with focal points 26-1 and 26-N, respectively, at substantially the surface 82 of object 80. As described above, the receiver includes a plurality of receiver channels for focusing at a large number of points during the receiving process. Means for controlling the focal points by control of the variable delay means are described hereinbelow.

Signal outputs from sections 30A-1 through 30A-N of signal delay means 30A are connected to summing amplifiers 34-1 through 34-N, respectively, and outputs from the summing amplifiers are connected to signal processors 36-1 through 36-N, respectively, which may be of the same type shown in FIGS. 1 and 2 and described above. Additionally, the outputs from summing amplifiers 34-1 through 34-N are supplied to focus and range control circuits 86-1 through 86-N, respectively, from which control signals are derived for use in controlling the focal point and associated range zone from which signals are processed.

Focus and range control circuit 86-N in one receiver channel is shown to include an envelope detector 90 to which the output from summing amplifier 34-N is supplied. Obviously, the signal from the summing amplifier may be amplified prior to application to the envelope detector. The envelope detector has an output that is proportional to the envelope of the high frequency signal output from summing amplifier 34-N. An adjustable range gate 92 having an input from timing and control unit 20A and an output connected to the envelope detector 90 enables the envelope detector during the period that a large echo signal is received from the surface 82 of object 80. For the Nth channel, envelope detector is gated on during the period that echo signals are received from the surface 82 of object 80 substantially at focal point 26-N. A range gate signal 92-1 from range gate 92 and a detected return signal 90-1 from envelope detector 90 when gated on are shown in FIG. 4.

The envelope detector output is supplied to a voltage comparator 94 for sensing the large return signal from surface 82 of object 80, and the pulse output 94-1 of comparator 94 is supplied over line 96 to timing and control unit 20A. A reference signal supplied as a second input to voltage comparator 94 establishes the level of the input signal from envelope detector 90 at which an output is provided from the voltage comparator. The reference level is set above that of return signals from the gated envelope detector obtained from scatterers located ahead of and behind the surface 82 to avoid operation of voltage comparator 94 by such return signals.

The voltage comparator output 94-1 is supplied to timing and control unit 20A. Information concerning the time of arrival of the echo signal from surface 82 of object 80, together with the time of pulse energization of the transducer array, provide a measure of the distance of the surface from the transducer array. This information is utilized by the timing and control unit 20A to set the signal delays provided by delay elements in section 30A-N of delay unit 30A to provide for focusing at focal point 26-N at surface 82 of the object 80. This same information is used by timing and control unit 20A to generate gate enable signals which are supplied to gated integrator 50 (FIG. 2) in signal processor 36-N for enabling the integrator while echo signals are received from range zone Z-N beyond focal point 26-N.

From the above it will be apparent that each receiver channel is separately focused at a depth dependent upon the distance of surface 82 from the transducer array, and that the location of the range zone over which return signals are detected and integrated is dependent upon the depth at which the associated receiving channel is focused. Except for the above-described control of the focal length of groups of receiving transducer elements and control of the range zone from which return signals are processed, the imaging system functions in the same manner described above with reference to the system shown in FIGS. 1 and 2. As described above, outputs from the signal processors 36-1 through 36-N are prepared by display processor 38 for display at display 40. Now, instead of providing a display of an image of a plane, an image of a contoured surface is provided, here surface 82 of object 80.

Figure 5:
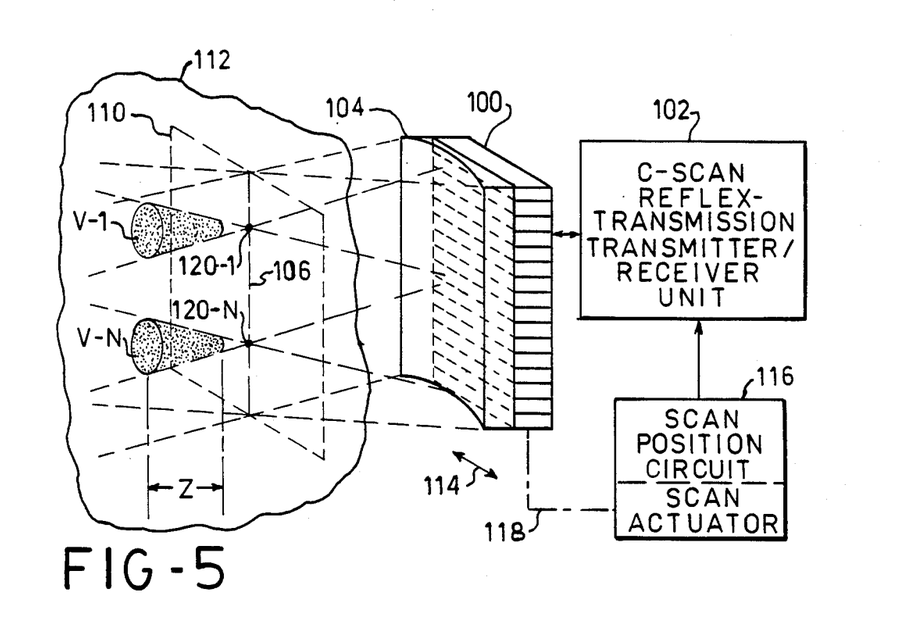
FIG. 5 is a block diagram showing another modified form of this invention employing a linear transducer array.

Another modified form of this invention is shown in FIG. 5 wherein pixel values for a line of display are recurrently obtained, rather than pixel values for a field of display. In FIG. 5, a linear transducer array 100 is shown connected to a C-scan reflex-transmission transmitter/receiver unit 102 which may be of the type shown in FIGS. 1 and 2 and described above. Acoustical focusing means 104, comprising a cylindrical focusing lens, is associated with the transducer array for focusing thereof along line 106 in image plane 110. The cylindrical lens is oriented such that the focus line 106 extends in the same direction as the longitudinal axis of the linear transducer array, here vertically. Acoustic coupling means, not shown, couples the transducer array to the subject 112 to be imaged.

The transducer and focusing lens are scanned back and forth in the direction of double headed arrow 114 by scan actuator 116 connected thereto through connecting means 118 for scanning the line of focus 106 across the plane 110 to be imaged.

The scanning mechanism 116 includes a scan position information circuit having an output related to the location of the transducer array along the path of travel thereof. This output is connected to the timing and control unit included in transmitter/receiver unit 102, which timing and control unit has outputs for synchronizing the transmitting, receiving, and display scanning operations, all in a manner described above with reference to the arrangement shown in FIGS. 1 and 2.

The receiver in unit 102 operates to process echo signals received from range zone, Z, behind the focal plane 110. As described above, the receiver includes a plurality of signal processor channels for simultaneously acquiring a plurality of pixel values. In the FIG. 5 arrangement, pixel values are obtained relative to a plurality of focal points along the line of focus 106. In FIG. 5, for clarity of illustration, only two such focal points 120-1 and 120-N are shown together with the associated volumes V-1 and V-N from which echo signals are received for obtaining information concerning focal points 120-1 and 120-N, respectively. As in the arrangement shown in FIGS. 1 and 2, the number of signal processor channels included in the associated receiver equals the number of focal points, N, for which pixel values are simultaneously obtained following each pulse transmission. In the FIG. 5 arrangement pixel values from along a single line 106 are simultaneously obtained, with values for the entire image plane being obtained by recurrently operating transmitter/receiver unit 102 while scanning the line of focus 106 across the image plane 110. It will be apparent that with the FIG. 5 arrangement fewer signal processing channels are required for obtaining pixel values than in the arrangement of FIGS. 1 and 2 for imaging the same size field.

Figure 6:
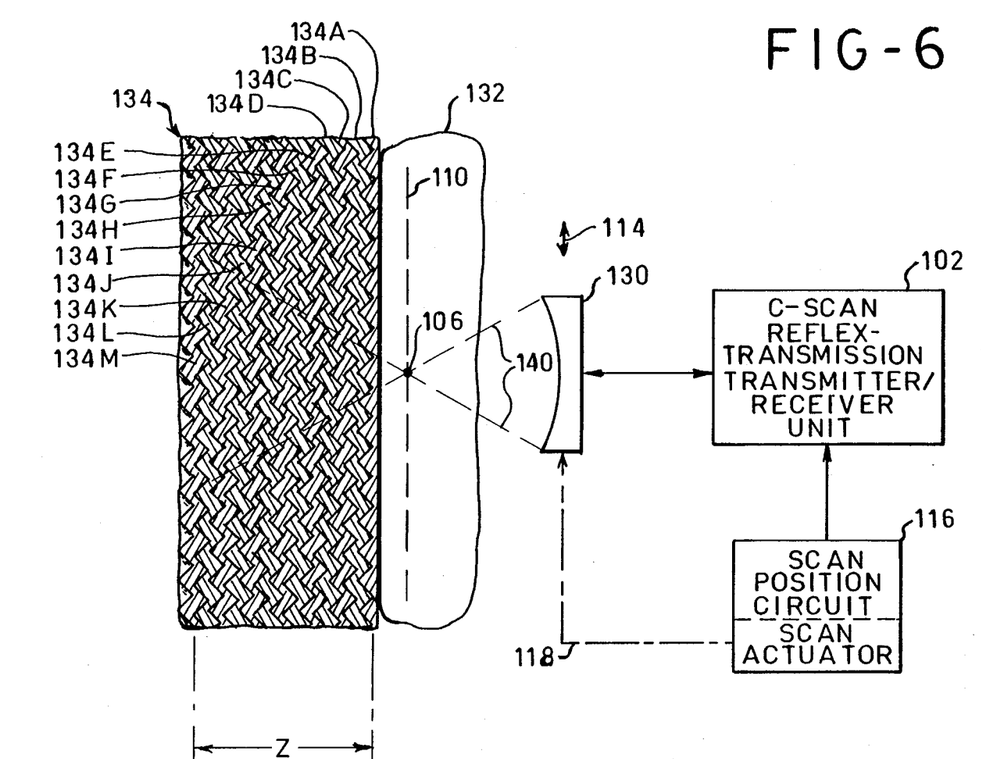
FIG. 6 is a block diagram showing yet another modified form of this invention which is similar to that shown in FIG. 5 and which shows use of external reflecting means.

As described in above-mentioned copending patent application Ser. No. 755,287, external reflecting means may be employed for reflection of signals back into the object under examination for imaging a plane within the object. Such an arrangement is shown in Fig. 6, to which figure reference now is made. A linear transducer array 130 is shown wherein the line along which the individual transducer elements extend is normal to the plane of the drawing. Linear transducer array 130 is provided with a curved face for focusing thereof along line 106, perpendicular to the plane of the drawing, in subject 132 under examination. Obviously, a linear transducer array with an associated cylindrical focusing lens, such as shown in FIG. 5, may be employed in place of focusing linear transducer array 130. As with the arrangement shown in FIG. 5 linear transducer array 130 is connected to a C-scan reflex-transmission transmitter/receiver unit 102 of the same type shown in FIG. 5 and described above. Scanning mechanism 116, of the above-described type, is connected through connecting means 118 to the linear transducer array for movement thereof back and forth in the direction of double-headed arrow 114, and information concerning the location of the transducer array along its path of travel is supplied to the transmitter/receiver unit 102 from a scan position circuit included in the scanning mechanism.

Acoustical reflecting means 134 is acoustically coupled to the subject 132 opposite the transmitting transducer 130. Reflected ultrasonic signals from within reflecting means 134 return to the transducer through the subject 132. As with the arrangement shown in FIG. 5, the receiver of transmitter/receiver unit 102 operates to process echo signals received from range zone, Z, behind the focal plane 110 within reflecting means 134. The receiver includes a plurality of signal processor channels for simultaneously acquiring a plurality of pixel values from along the line of focus 106. By scanning line 106 across the subject, pixel values for the entire image plane 110 are obtained.

Figure 7:
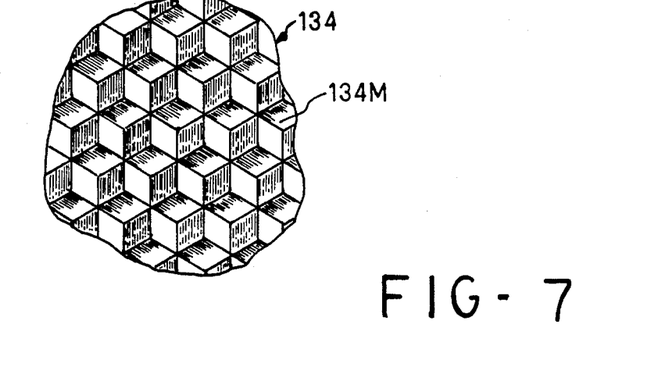
FIG. 7 is an enlarged fragmentary plan view of the reflecting means shown in FIG. 6.

In accordance with the FIG. 6 invention, acoustical reflecting means 134 includes a plurality of thin layers of acoustic transmitting material with at least one face of each layer defining an array of corner reflectors. In FIG. 6, acoustic reflecting means 134 is shown comprising abutting layers 134A through 134M. A fragmentary plane view of the outer surface of layer 134M is shown in FIG. 7. Adjacent layers have different acoustic impedances whereby interfaces between layers comprise acoustic discontinuities for reflection of ultrasonic waves. Since the discontinuities are in the form of corner reflectors, acoustical energy reflected therefrom is returned back along a path substantially parallel to the incident energy waves. If the incident energy waves are focused, as are transmitted waves 140 which are focused along focal line 106, energy reflected from the corner reflectors is concentrated in the vicinity of the focal line. Obviously, the corner reflecting type acoustical reflecting means 134 may be used with other systems wherein a conically focused beam is employed whereby waves reflected therefrom are concentrated in the vicinity of the focal point of the transmitted waves.

If desired, at least one outer layer, here layer 134-A, may include a smooth outer face to facilitate acoustically coupling of the reflecting means to subject 132. Although the layers of the reflecting means may include scatterers, they preferably are free of scatterers whereby substantially all of the ultrasonic signals are reflected by the corner reflectors at interfaces between layers. For this reason, preferably very thin layers are employed.

Layers of the reflecting means may comprise, for example, plastic sheets with an array of corner reflectors formed by any suitable means, such as molding, machining, embossing, or the like, at one or both faces thereof. In FIG. 6, layers 134A, C, E, G, I, K and M comprise sheets formed with surfaces of corner reflectors, and layers 134B, D, F, H, J and L comprise layers of adhesive, or the like, for joining the sheets. Sheets may be formed of the same material having the same acoustic impedance, which impedance differs from that of the material which couples adjacent sheets. Consequently, adjacent layers, here a layer of adhesive and a plastic sheet, have different acoustic impedances for the reflection of acoustic waves from the array of corner reflectors provided at interfaces therebetween. By forming the reflecting means 134 of resilient material it may be contoured to a curved object, or subject under examination. If desired, a substantially rigid layer, or layers, of reflecting means may be employed. It will be apparent that the corner reflector array patterns of different layers may have different periodicities. Instead of adhesive, a plurality of sheets formed with arrays of corner reflectors, such as sheets 134A, C, E, G, I, K and M may be immersed in a sound-conducting liquid having an acoustic impedance that differs from that of the sheets. If desired, the stack of sheets and liquid in which they are immersed may be contained in a liquid-tight bag or housing, for convenience.

Figure 8:
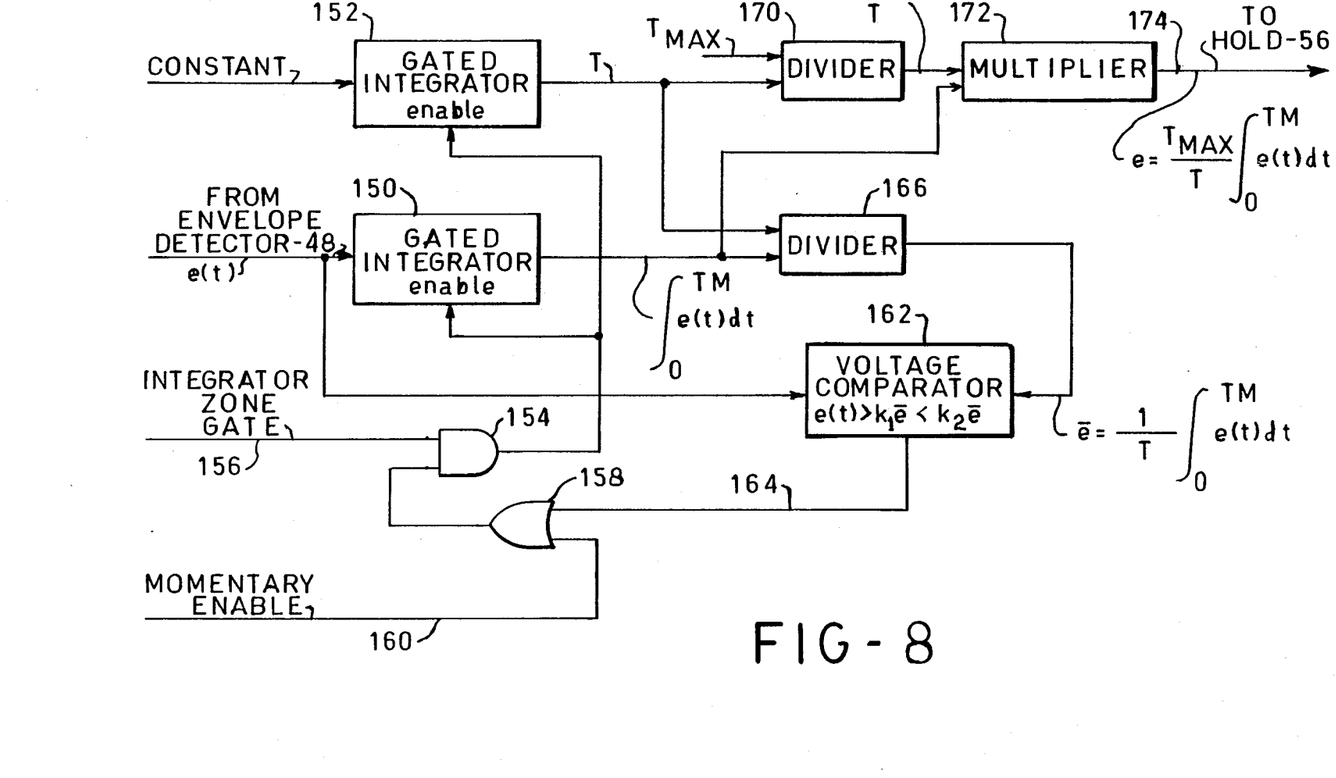
FIG. 8 is a block diagram showing details of a portion of a modified form of signal processor for use in imaging a subject wherein the backscattering zone is not substantially uniform in its reflective properties.

In FIG. 8 a modified form of signal processing means is shown which may be employed in the signal processors 36-1 through 36-N shown in FIG. 1. The circuit shown in FIG. 8 is adapted for use in imaging situations wherein the reflective properties of the backscatter zone are not substantially uniform. Non-uniform reflective properties are encountered, for example, where bone or air are present, causing a large reflection followed by little or no reflected energy, or where substantially anechoic material, such as blood vessel, cyst, gallbladder, or the like, is present in the backscattering zone.

The circuit of FIG. 8 includes first and second gated integrators 150 and 152 to which the output, e(t) from envelope detector 48 (see FIG. 2) and a constant voltage signal, respectively, are supplied. The integrators are gated on and off in synchronism under control of the output from and AND gate 154 connected to the gate enable input of the integrators. For simplicity, the integrator reset inputs are not shown in FIG. 8.

Figure 3:
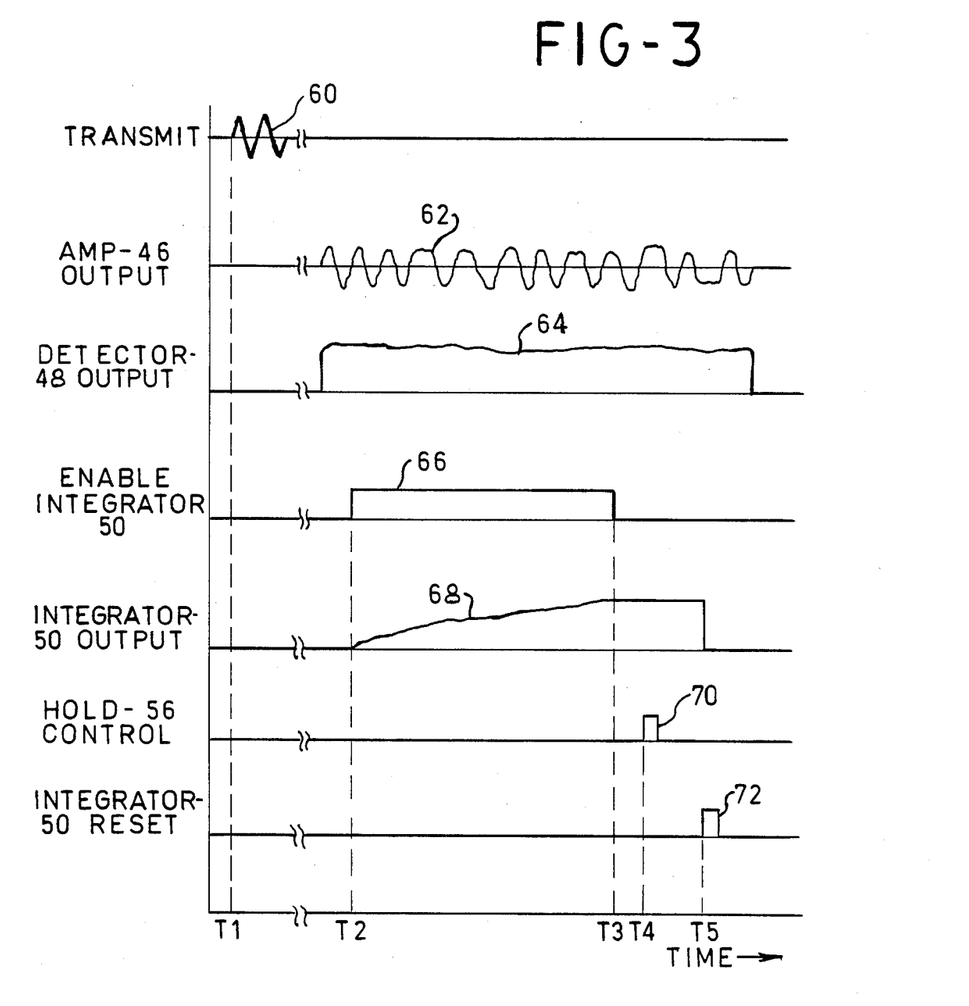
FIG. 3 is a timing diagram for use in explaining operation of the system shown in FIG. 1.

An integrator zone gate signal, which corresponds to integrator enable signal 66 of FIG. 3, is supplied over line 156 as one input of AND gate 154. The other AND gate input is provided by the output of an OR gate 158. It will be apparent that in the presence of an integrator zone gate signal, the integrators will be enabled so long as a second input is supplied to AND gate 154 from OR gate 158. A momentary enable signal is supplied as one input to OR gate 158 over line 160 during the initial portion of the integrator zone gate signal at line 156, which momentary enable signal ensures that the gated integrators 150 and 152 are gated on at the beginning of the integrator zone gate signal. A second input for OR gate 158 is obtained from the output of a voltage comparator 162 over line 164, the operation of which comparator is described hereinbelow.

The output from gated integrator 150 is the time integral of e(t) over the period of time that the integrator is enabled from time 0 to time TM. This output, $$\int_0^{TM} e(t)dt,$$

is supplied as one input to a divider circuit 166. A second input for divider circuit 166 is provided by the output, T, from the second gated integrator 152. With a constant input voltage to integrator 152, the output, T, therefrom is directly proportional to the time that the integrator is enabled. At divider 166 the output of integrator 150 is divided by the output from integrator 152 to provide for a divider output of $$\bar{e} = \frac{1}{T} \int_0^{TM} e(t)dt \qquad (1)$$

It will be seen, then, that output $\bar{e}$ from divider 166 comprises a cumulative average of the signal envelope e(t) during the integrator on-time.

The average signal $\bar{e}$ together with the signal envelope, e(t) are supplied to voltage comparator 162 for continual comparison thereof. An output is provided at output line 164 of comparator 162 when $e(t) > k_1\bar{e} < k_2\bar{e}$ where $k_1$, and $k_2$ are constants and $k_1 < k_2$. During time periods that the signal envelope, e(t), falls below or exceeds the average, $\bar{e}$, by the predetermined factors $k_1$ and $k_2$, respectively, the integrators 150 and 152 are disabled by the comparator output during which time the envelope signal, e(t) is not incorporated into the average, $\bar{e}$, by integrator 150 and the constant voltage at the input to integrator 152 is not incorporated into the integrator output, T.

If during the receiving operation, during the presence of an integrator zone gate signal at line 156, there is no interruption in the operation of gated integrators 150 and 152, the output, T, from integrator 152 will reach a predetermined maximum value, $T_{MAX}$, dependent upon the value of the constant input voltage thereto and the length of time of the integrator zone gate signal. This constant value, $T_{MAX}$, together with the value, T, from integrator 152, are supplied as inputs to divider circuit 170, the output from which circuit equals $T_{MAX}/T$. As noted above, with no interruption in the operation of the gated integrators 150 and 152, T equals $T_{MAX}$ whereby the ratio thereof equals 1 (one). The output from divider 170 is supplied to a multiplier circuit 172 together with the output from gated integrator 150 whereby the signal output from multiplier 172 is $$e = \frac{T_{MAX}}{T} \int_0^{TM} e(t)dt \qquad (2)$$

This weighted output, e, comprises a pixel value which is supplied over line 174 to hold circuit 56 (See FIG. 2) for subsequent display.

Although the operation of the circuit of FIG. 8 is believed to be apparent from the above description, a brief description of the operation thereof with reference to the waveforms of FIG. 9 will be made. There, waveforms illustrate the following operating conditions: (A) operation where the reflective properties of the backscatter zone are substantially uniform, (B) operation where a bone or air is present in the backscatter zone, and (C) operation where substantially anechoic material is present in the backscatter zone.

Figure 9:
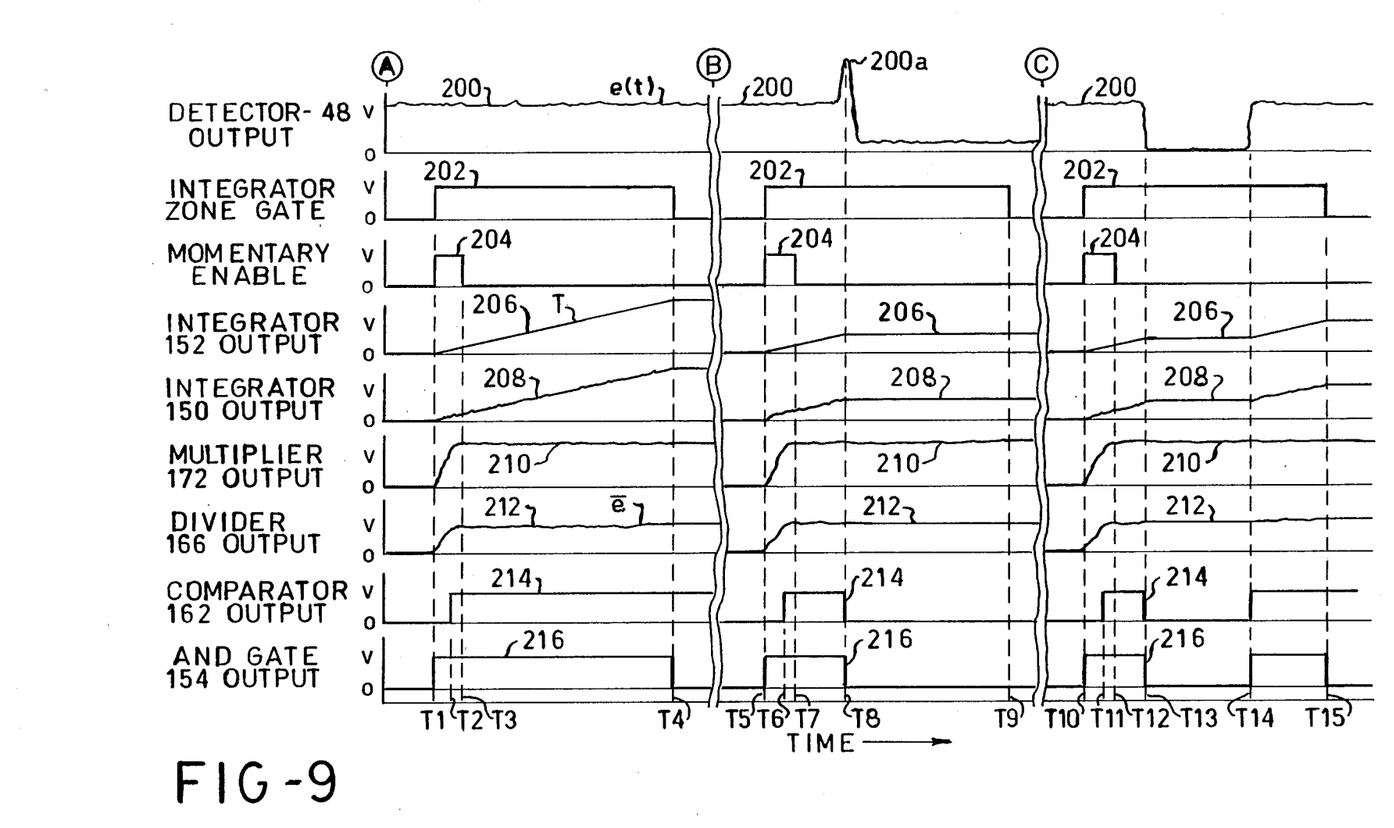
FIG. 9 is a timing diagram for use in explaining operation of the processor shown in FIG. 8.

In the group (A) waveforms of FIG. 9 an envelope detector output 200 is shown (that corresponds to output 64 shown in FIG. 3) which output is relatively constant indicating that the reflective properties of the backscattering zone from which the signals are received are substantially uniform. An integrator zone gate signal 202 is supplied over line 156 to AND gate 154 beginning at time T1 and terminating at time T4. At time T1 a short momentary enable signal 204 is supplied as a second input to AND gate 154 through OR gate 158 ensuring that an AND gate output is produced to enable integrators 150 and 152. Integrator outputs 206 and 208 from integrators 152 and 150, respectively, are shown in FIG. 9. With the assurance of inputs to divider 166 from the gated integrators between times T1 and T2, an output, $\bar{e}$ (waveform 212) is formed at the divider output for input to comparator 162 along with the envelope input signal, e(t) (waveform 200). At time T1 $e(t) > k_2\bar{e}$ whereby no output is provided at output line 164 of voltage comparator 162. At time T2, the output $\bar{e}$ (waveform 212) from divider 166 has risen to a level such that $e(t) < k_2\bar{e}$ whereby an output 214 is provided from the comparator. At the end of the momentary enable signal 204, at time T3, the comparator output 214 continues to enable AND gate 154 for the remainder of the integrator zone gate signal 202. Consequently, both integrators 150 and 152 are enabled to the end of the integrator zone gate signal 202 at time T4. When integrator zone gate signal 202 ends at time T4, integrators 150 and 152 are disabled and integration ceases.

Because integrator 152 was enabled during the entire integrator zone gate period between times T1 and T4, the output, T, therefrom equals $T_{MAX}$ at time T4 whereby the output from divider 170 is unity. The multiplier 172 output at line 174 therefore equals the output $$\int_0^{TM} e(t)dt$$

from gated integrator 150. (It here will be noted that this is the same output as provided by the circuit of FIG. 2 when substantially uniform scatterers are present in the associated range zone.) As noted above, the output at line 174 is supplied to a hold circuit to provide a pixel value for use in a display.

In the group (B) waveforms of FIG. 9, waveform 200 is seen to include a large peak 200a, at time T8, followed by a very low signal. As noted above, such an envelope signal may occur where bone or air is present in the integration zone. In this (B) group of waveforms the integrator zone gate signal 202 and momentary enable signal 204 are the same as shown in group (A). Now, signal e(t) (waveform 200) at the input to comparator 162 exceeds $K_2\bar{e}$ at time T8 whereupon the output from the comparator goes low and, as a result, integration stops. As the signal e(t) (waveform 200) rapidly drops from the peak to the low signal value the comparator provides a momentary output, not shown in FIG. 9. At the low signal condition of e(t) after time T8, $e(t) < k_1\bar{e}$ whereupon the comparator 162 output 214 and AND gate 154 output 216 remain low during the remainder of the receiver cycle of operation.

Now, since integrator 152 has not been enabled for the entire receiver period between times T4 and T9, $T_{MAX}$ exceeds T whereby the divider 170 output is greater than unity. The gated integrator 150 output 208 is multiplied by the factor $T_{MAX}/T$ at multiplier 172 to provide an output therefrom which would substantially equal that if the range zone were comprised of substantially uniform scatterers. It will be seen that with the FIG. 8 circuit, that portion of the group (B) envelope signal e(t) after time T8 is not employed in the determination of the pixel value.

In the group (C) waveforms of FIG. 9, waveform 200 is seen to exhibit a large drop in value between times T13 and T14. As noted above, such a signal may occur where an anechoic material is present in the range zone. Here, the anechoic material is located intermediate the opposite ends of the range zone period which extends from time T10 to T15. In this group of waveforms signal e(t) (waveform 200) at the input to comparator 162 falls below $k_1\bar{e}$ at time T13 whereupon the outputs 214 and 216 from the comparator 162 and AND gate 154, respectively, go low and integrators 150 and 152 are disabled. At time T14 signal 200 returns to a substantially normal level whereupon $e(t) > k_1\bar{e} < k_2\bar{e}$. Consequently, the comparator output 214 and AND gate output 216 go high at time T14 whereupon integration resumes and continues until the end of integrator zone gate signal 202 at time T15. Again, the signal output 208 from integrator 150 is some fractional part of what it would have been if the anechoic material were not present and the range zone comprised material having substantially uniform reflective properties. A multiplier $T_{MAX}/T$ is calculated at divider 170 by which factor the integrator 150 output 208 is multiplied at multiplier 172.

The invention having been described in detail in accordance with requirements of the patent statutes, other changes and modifications will suggest themselves to those skilled in this art. The additional processing of received signals to remove or compensate for the nonuniformity of scatterer density behind the focal plane shown in FIGS. 8 and 9 may be accomplished using other methods. For example, return signals may be digitized and segments thereof to be deleted may be selected on the basis of histogram distributions. Also, it will be apparent that digital processing methods rather than the analog methods shown and described herein may be employed throughout the system. In addition, receiver functions may be performed by software in a suitably programmed computer, or computers, after conversion of the received transducer signals outputs to digital form. If desired, signals from elements of the transducer array may be converted to digital form and recorded. The sequences of recorded signals then may be operated upon computationally to determine pixel values. Such operation may be in "real-time" or not real-time. Obviously, simultaneous processing of echo signals for simultaneously imaging multiple planes and/or multiple surfaces using equations defining the image formation process may be provided. Also, gating of the receiver at points other than the gated integrators in the signal processors may be employed. For example, gated amplifiers instead of gated integrators may be used. As noted above, detection and/or integration of focused received signals may be carried out on a non-linear function of the signals. Furthermore, it will be apparent that a chirped signal, or otherwise coded signal source, may be employed to generate a chirped or otherwise coded ultrasonic wave, together with a receiver for processing the chirped or coded echo signals. Also, continuous rather than pulse operation of the novel reflex-transmission imaging system may be employed by using a continuously variable frequency, or otherwise coded, source and associated receiver. Obviously, signals received from outside the range zone may be processed, as desired. Additionally, the two-dimensional transducer array may be of different shape, and may be completely filled, as illustrated, or incompletely filled, as with a "sparse" or "sampled" array. It is intended that the above and other such changes and modifications shall fall within the spirit and scope of the invention defined in the appended claims.

I claim:

1. In a reflex transmission ultrasonic imaging system for imaging a section within a subject, which systems includes transducer array means and transmitter means for energizing the transducer array means for beaming ultrasonic wave energy into the subject, said transducer array means receiving reflected ultrasonic waves and converting the same to electrical signals, the combination including;
   focusing means, including electronic focusing means responsive to received electrical signals from the transducer array means, for simultaneously focusing the transducer array means at a plurality of focal points at the section to be imaged, said focusing means having a plurality of simultaneous outputs each associated with a focal point, and
   signal processing means including a plurality of signal processing channels for simultaneously processing outputs from the electronic focusing means produced in response to reflected ultrasonic waves that are received by said transducer array means from range zones opposite the section to be imaged from the transducer array means and for generating a plurality of pixel values which are substantially dependent upon and provide a measure of attenuation of ultrasonic waves at the focal points, a plurality of said pixel values being recurrently produced substantially simultaneously by said signal processing means.

2. In reflex transmission ultrasonic imaging system as defined in claim 1 wherein each of said signal processing channels includes,
   means for detecting an output from said electronic focusing means, and
   means for integrating the output from said detecting means over a period of time that reflected ultrasonic waves are received from within the associated range zone.

3. In a reflex transmission ultrasonic imaging system as defined in claim 1 wherein the transmitted ultrasonic energy beam is substantially unfocused,
   said electronic focusing means includes means for focusing at a two dimensional array of focal points at the section to be imaged, and
   pixel values for a full field of display are substantially simultaneously produced by said signal processing means.

4. In a reflex transmission ultrasonic imaging system as defined in claim 1 wherein the section to be imaged comprises a plane surface.

5. In a reflex transmission ultrasonic imaging system as defined in claim 1 wherein the section to be imaged comprises a contoured surface.

6. In a reflex transmission ultrasonic imaging system as defined in claim 1 including,
   means for preventing processing of an output from the electronic focusing means over the entire associated range zone whenever a large change in signal strength occurs in said output within the range zone, and
   means for weighting pixel values from said signal processing channels in accordance with the portion of the associated range zone over which signals from the focusing means are processed by the signal processing channel.

7. In a reflex transmission ultrasonic imaging system as defined in claim 1 wherein said transducer array means comprises a linear transducer array,
   said focusing means including means for focusing the transmitted ultrasonic energy beam along a line,
   said transducer array being focused at a plurality of focal points along said line during reception of reflected ultrasonic waves, and
   means for scanning the line of focus across the section to be imaged for imaging said section.

8. In a reflex transmission ultrasonic imaging system as defined in claim 7 including
   ultrasonic reflecting means comprising a plurality of layers each of which is formed with an array of corner reflectors, adjacent layers having different acoustic impedances for reflection of acoustic energy at interfaces between layers, and
   means for acoustically coupling said reflecting means to the subject opposite said ultrasonic transducer array means, at least some electrical signals for processing by said signal processing means being derived from echo signals received from corner reflectors of the ultrasonic reflecting means.

9. In a reflex transmission ultrasonic imaging system as defined in claim 8 wherein said ultrasonic reflecting means comprises a plurality of sheets of material each of which sheets is formed with an array of corner reflectors at at least one face, and
   means for adhering the sheets together in face-to-face relationship.

10. In a reflex transmission ultrasonic imaging system as defined in claim 7 wherein said means for focusing the transmitted ultrasonic energy beam along a line comprises an acoustic cylindrical focusing lens.

11. In a reflex transmission ultrasonic imaging system as defined in claim 7 wherein said means for focusing the transmitted ultrasonic energy beam along a line comprises means for forming the linear transducer array with a curved face.

12. In a reflex transmission ultrasonic imaging system for imaging a section within a subject, said system comprising;
   a two-dimensional ultrasonic transducer array,
   transmitter means for energizing the transducer array for beaming ultrasonic energy waves into the subject for insonification of the section to be imaged, said transducer array receiving echo signals and converting the same to electrical signals,
   electronic focusing means responsive to received electrical signals from the transducer array for simultaneously focusing at an array of focal points at the section to be imaged and having a plurality of outputs equal in number to the number of points at which the transducer array is simultaneously focused,
   a plurality of signal processing channels each of which is responsive to an output from said electronic focusing means, each said channel being responsive to a signal produced by echo signals received from a range zone opposite the associated focal point for generating a pixel value related to attenuation of acoustic waves at the focal point.

13. In a reflex transmission ultrasonic imaging system as defined in claim 12 wherein each of said signal processing channels comprises means for detecting an output from said electronic focusing means, and
   means for integrating the output from said detecting means over a period of time that echo signals are received from the associated range zone.

14. In a reflex transmission ultrasonic imaging system as defined in claim 12 wherein said transmitted beam is substantially unfocused for insonification of the entire section to be imaged.

15. In a reflex transmission ultrasonic imaging system as defined in claim 12 wherein said electronic focusing means comprise a plurality of channels each of which includes a plurality of signal delay means and summing means for summing outputs from the signal delay means.

16. In a reflex transmission ultrasonic imaging system as defined in claim 12 wherein the section to be imaged comprises a plane surface.

17. In a reflex transmission ultrasonic imaging system as defined in claim 12 wherein the section to be imaged comprises a contoured surface.

18. In a reflex transmission ultrasonic imaging system for imaging a section within a subject, said system comprising;
   a focused linear transducer array that is focused along a line in the section to be imaged,
   transmitter means for energizing the transducer array for beaming ultrasonic energy waves into the subject that are focused along said line, said transducer array receiving echo signals and converting the same to electrical signals,
   electronic focusing means responsive to received electrical signals for simultaneously focusing the transducer array at a plurality of points along said line of focus and having a plurality of outputs equal in number to the number of points at which the transducer array is simultaneously focused, and
   a plurality of signal processing channels each of which channels is responsive to an output from said electronic focusing means, each said channel being responsive to a signal produced by echo signals received from a range zone opposite the associated focal point for generating a pixel value related to attenuation of acoustic waves at the focal point, and means for scanning the line of focus over the section to be imaged for imaging the section.

19. In a reflex transmission ultrasonic imaging system as defined in claim 18 wherein each of said signal processing channels comprises means for detecting an output from said electronic focusing means, and means for integrating the output from said detecting means over a period of time that echo signals are received from the associated range zone.

20. In an ultrasonic imaging method for imaging a section of the interior of a subject, the steps comprising, insonifying at least a portion of a plane to be imaged within the subject, receiving by a transducer array echo signals from scatterers within a range zone opposite the section to be imaged from the transducer array, while receiving echo signals, simultaneously focusing said transducer array at a plurality of focal points lying in the section to be imaged to produce a plurality of signal outputs equal in number to the number of focal points at which the transducer array is focused, and individually processing said signal outputs produced in response to reflected ultrasonic waves that are received by the transducer array from a range zone opposite the associated focal point for substantially simultaneously generating a plurality of pixel values that are substantially dependent upon and provide a measure of attenuation of ultrasonic waves at the focal points.

21. In an ultrasonic imaging method as defined in claim 20 wherein the step of individually processing said signal outputs comprises, detecting the individual signal outputs, and integrating the detected signals over time periods that echo signals are received from the range zone opposite the associated focal points.

22. In an ultrasonic imaging method as defined in claim 21 which includes, in response to a large change in strength of a detected signal during the time period that echo signals are received from the range zone, stopping integrating of the detected signals to avoid processing of signal outputs produced in response to ultrasonic waves reflected from bone, air, anechoic material, and the like, and weighting the pixel values in accordance with the portion of the associated range zone over which detected signals are integrated.

23. In an ultrasonic imaging method as defined in claim 20 which includes, acoustically coupling reflecting means formed with layers of corner reflector arrays to the subject opposite the transducer array from which corner reflectors echo signals are received for imaging the section in the subject.

24. In an ultrasonic imaging method as defined in claim 20 wherein the section imaged comprises a plane section.

25. In an ultrasonic imaging method as defined in claim 20 wherein the section imaged comprises a contoured section.

26. In a reflex transmission ultrasonic imaging system for imaging a contoured surface within a subject, which system includes transducer array means and transmitter means for energizing the transducer array means for beaming ultrasonic wave energy into the subject, said transducer array means receiving reflected ultrasonic waves and converting the same to electrical signals, the combination including;

focusing means, including variable electronic focusing means responsive to received electrical signals from the transducer array means, for simultaneously focusing the transducer array means at a plurality of focal points at the contoured surface to be imaged, and signal processing means for processing the output from the electronic focusing means produced in response to reflected ultrasonic waves that are received by said transducer array means from range zones opposite the contoured surface to be imaged from the transducer array means and for generating a plurality of pixel values which are substantially dependent upon and provide a measure of attenuation of ultrasonic waves at the focal points.

27. In a reflex transmission ultrasonic imaging system as defined in claim 26 including focus and range control means responsive to the output from the electronic focusing means for controlling the variable electronic focusing means and the signal processing means.

28. In an ultrasonic imaging method for imaging the interior of a subject, the steps comprising, insonifying at least a portion of a contoured surface to be imaged within the subject, receiving by a transducer array echo signals from discontinuities opposite the contoured surface from the transducer array, while receiving echo signals, simultaneously focusing said transducer array at a plurality of focal points lying substantially on the contoured surface to produce a plurality of signal outputs equal in number to the number of focal points at which the transducer array is focused, and individually processing said signal outputs produced in response to reflected ultrasonic waves that are received by the transducer array from range zones opposite the associated focal points for substantially simultaneously generating a plurality of pixel values that are substantially dependent upon and provide a measure of attenuation of ultrasonic waves at the focal points.

29. In an ultrasonic imaging method as defined in claim 28 wherein the step of individually processing said signal outputs comprises, detecting the individual signal outputs, and integrating the detected signals over time periods that echo signals are received from the range zones opposite the associated focal points.

30. An acoustical reflector for use with an ultrasonic imaging system, or the like, for reflecting ultrasonic energy, said reflector comprising, a plurality of layers of acoustic transmitting material, adjacent layers having different acoustic impedances for reflection of ultrasonic energy at interfaces between layers, and wherein interfaces between adjacent layers define arrays of corner reflectors.

31. An acoustical reflector as defined in claim 30 wherein the arrays of corner reflectors have the same periodicities.

32. An acoustical reflector as defined in claim 30 wherein arrays of corner reflectors have different periodicities.

33. An acoustical reflector as defined in claim 30 wherein layers of acoustic transmitting material comprise sheets of acoustic transmitting material formed with an array of corner reflectors at at least one face thereof.

34. An acoustical reflector as defined in claim 33 including means for adhering said sheets together in face-to-face relationship.

35. An acoustical reflector as defined in claim 33 including liquid between said sheets.

36. In an ultrasonic imaging system comprising transducer means for receiving ultrasonic signals reflected from within an object, the combination including means for focusing the transducer means at at least one focal point within the object, signal processing means responsive to reflected signals received by the transducer means from a range zone that is opposite the focal point from the transducer means for generating a pixel value which is substantially dependent upon and provides a measure of attenuation of ultrasonic waves at the focal point, means for halting processing of reflected signals by said signal processing means in response to a large change in amplitude of reflected signals from the range zone, and means for weighting pixel values from said signal processing means in an amount related to the portion of the range zone over which reflected signals are processed by said signal processing means.

37. In an ultrasonic imaging system as defined in claim 36 wherein said signal processing means includes means for detecting a received signal output from the transducer means, and means for integrating the output from said detecting means.

38. In an ultrasonic imaging system as defined in claim 37 wherein said integrating means comprises gated integrating means that is gated off by said means for halting processing of reflected signals in response to a large change in amplitude of the detecting means output.

39. In a reflex transmission ultrasonic imaging method for non-invasive examination of the interior of objects such as body parts from reflections from scatterers within the object of ultrasonic energy, steps including receiving by means of focused transducer means reflected ultrasonic energy and converting the same to electrical signals, detecting electrical signals from the transducer means, integrating detected signals over a time period during which reflected ultrasonic energy is received from a range zone having substantially uniform reflective properties that is opposite the point of focus from said transducer means, the integrated signal being related to attenuation at the point of focus, if the range zone does not have substantially uniform reflective properties, then integrating detected signals over a portion of said time period during which reflected ultrasonic energy is received from the range zone, and weighting the integrated signal in proportion to the portion of the image zone over which detected signals are integrated to establish a pixel value.

* * * * *